US012785581B1

(12) United States Patent
Hung

(10) Patent No.: US 12,785,581 B1
(45) Date of Patent: Nov. 3, 2026

(54) POWER SUPPLY SYSTEM AND CONTROL METHOD THEREOF

(71) Applicant: Delta Electronics, Inc., Taoyuan City (TW)

(72) Inventor: Chung-Te Hung, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 0 days.

(21) Appl. No.: 19/305,256

(22) Filed: Aug. 20, 2025

(30) Foreign Application Priority Data

May 28, 2025 (CN) ......................... 202510698811.1

(51) Int. Cl.
*H02M 7/217* (2006.01)
*H02M 1/42* (2007.01)

(52) U.S. Cl.
CPC ......... *H02M 7/217* (2013.01); *H02M 1/4208* (2013.01)

(58) Field of Classification Search
CPC ......... H02M 7/217; H02M 1/4208; H02J 3/00
See application file for complete search history.

(56) References Cited

U.S. PATENT DOCUMENTS

| | | | | |
|---|---|---|---|---|
| 10,056,818 | B2 * | 8/2018 | Xu | H02M 3/00 |
| 10,389,129 | B2 * | 8/2019 | Harnefors | H02J 3/34 |
| 11,283,260 | B2 * | 3/2022 | Sun | H02J 1/12 |

(Continued)

FOREIGN PATENT DOCUMENTS

| | | | |
|---|---|---|---|
| CN | 1450705 | A | 10/2003 |
| CN | 107666249 | A | 12/2019 |

(Continued)

OTHER PUBLICATIONS

J. M. Guerrero et al., "Output impedance design of parallel-connected UPS inverters with wireless load-sharing control," in IEEE Transactions on Industrial Electronics, vol. 52, Issue 4, Aug. 2005, pp. 1126-1135, doi: 10.1109/TIE.2005.851634.

(Continued)

*Primary Examiner* — Rexford N Barnie
*Assistant Examiner* — Joseph N Inge
(74) *Attorney, Agent, or Firm* — KIRTON McCONKIE; Evan R. Witt

(57) ABSTRACT

A control method for a plurality of power supplies in parallel connection is provided. Firstly, an output voltage and output current of a power converter and a current-sharing bus signal are detected, and an output voltage detection signal, an output current detection signal and an active current-sharing control command are generated. Then, a droop compensation voltage is generated. Then, the output current detection signal is converted into a virtual inductive compensation voltage according to an impedance model. Then, a current-sharing compensation voltage is generated according to a result of comparing the active current-sharing control command with the output current detection signal. After an arithmetic operation is performed on the droop compensation voltage, the virtual inductive compensation voltage and the current-sharing compensation voltage, a reference voltage is generated. A control signal is generated according to the reference voltage and the output voltage detection signal.

14 Claims, 5 Drawing Sheets

(56) References Cited

U.S. PATENT DOCUMENTS

| | | | | |
|---|---|---|---|---|
| 11,990,836 | B2 | 5/2024 | Lin et al. | |
| 2004/0201283 | A1* | 10/2004 | Pai | H02J 3/40 307/69 |
| 2013/0057237 | A1* | 3/2013 | Chen | H02M 3/1584 323/293 |
| 2013/0069611 | A1* | 3/2013 | Menegoli | H02M 3/1584 323/284 |
| 2014/0021929 | A1* | 1/2014 | Lin | G05F 1/10 323/271 |
| 2014/0268909 | A1* | 9/2014 | Digiacomo | H02M 3/33553 363/21.04 |
| 2017/0338741 | A1 | 11/2017 | Cai et al. | |
| 2019/0067988 | A1* | 2/2019 | Ghosh | H02J 9/062 |
| 2019/0165680 | A1 | 5/2019 | Hang et al. | |
| 2023/0147990 | A1* | 5/2023 | Lin | H02M 3/1584 323/234 |
| 2024/0113526 | A1* | 4/2024 | Miranbeigi | H02J 3/0014 |

FOREIGN PATENT DOCUMENTS

| | | | | |
|---|---|---|---|---|
| CN | 107666249 | B | 12/2019 | |
| CN | 114667673 | A | 6/2022 | |
| CN | 113054849 | B | 9/2022 | |
| CN | 116094322 | A | 5/2023 | |
| CN | 117810949 | A | 4/2024 | |
| CN | 118214095 | A | 6/2024 | |
| TW | 201010254 | A | 3/2010 | |
| TW | I798918 | B | 4/2023 | |
| WO | WO-2017217013 | A1 * | 12/2017 | H02M 7/48 |

OTHER PUBLICATIONS

Abd Aleleah Derbas et al., "A Hybrid Power Sharing Control to Enhance the Small Signal Stability in DC Microgrids", IEEE Transactions on Smart Grid, IEEE, USA, vol. 13, No. 3, Mar. 4, 2022 (Mar. 4, 2022), pp. 1826-1837, XP011906281, ISSN: 1949-3053, DOI: 10.1109/TSG.2022.3156850.

Elliot Fix et al., "AI-Aided Region-Based Active Stabilization in Autonomous DC Microgrids", 2021 IEEE Fourth International Conference on DC Microgrids (ICDCM), IEEE, Jul. 18, 2021 (Jul. 18, 2021), pp. 1-7, XP033953831, DOI: 10.1109/ICDCM50975.2021.9504634.

Yang Han et al., "Review of Power Sharing, Voltage Restoration and Stabilization Techniques in Hierarchical Controlled DC Microgrids", IEEE Access, vol. 7, Oct. 11, 2019 (Oct. 11, 2019), pp. 149202-149223, XP011751445, DOI: 10.1109/ACCESS.2019.2946706.

* cited by examiner

POWER SUPPLY SYSTEM AND CONTROL METHOD THEREOF

CROSS-REFERENCE TO RELATED APPLICATIONS

This application claims priority to China Patent Application No. 202510698811.1 filed on May 28, 2025. The entire content of the above-mentioned patent application is incorporated herein by reference for all purposes.

FIELD OF THE INVENTION

The present disclosure relates to a power supply system, and more particularly to a power supply system and a control method for the power supply system.

BACKGROUND OF THE INVENTION

Nowadays, the limited supply of fossil fuels can no longer meet the demands of sustained economic and social development, leading to widespread attention on the new energy industry. There is a rapidly growing demand for power supplies with lower cost, higher efficiency, and greater power density. Due to their outstanding performance advantages, LLC resonant converters are widely used in AC-DC and DC-DC power supplies.

To meet the demands of high-power applications, it is a usual approach to operate multiple power supplies in parallel. Ideally, each power supply shares the power equally. Under the condition of balanced current distribution, the output currents from the multiple power supplies are equal and the current intensity of individual power supplies is largely reduced.

However, in practical scenarios, the variations in component tolerances, the electrical parameters, the output voltage levels, the impedance values of the parallel wires for transmitting the output voltage to the load and some possible factors may result in unequal current sharing among the power supplies.

For example, in the parallel-connected architecture of multiple AC-DC power supplies, some drawbacks occur. Generally, the front-end power factor correction (PFC) stage generates a second-harmonic ripple on the Vbulk voltage. This ripple propagates to the rear-end DC-DC converter. Consequently, the output voltage of the rear-end DC-DC converter creates second-harmonic voltage ripples. If the amplitude or phase of these ripples differs slightly between power supplies, the parallel connection between the power supplies may easily result in a significant second-harmonic ripple in the output current.

In the parallel-connected architecture of multiple DC-DC power supplies, the problem of generating the second-harmonic ripple is avoided. However, like the parallel-connected architecture of multiple AC-DC power supplies, the parallel-connected architecture of multiple DC-DC power supplies still needs to face the challenges under dynamic load conditions. While the light load condition is switched to the heavy load condition, the output voltages from the power supplies with faster response or lower output impedance tend to have higher output voltage than other power supplies in parallel connection. Since more current is distributed to the power supplies with faster response or lower output impedance, a larger transient current-sharing error is generated.

In LLC resonant converters, even a 5% mismatch in resonant parameters can result in considerable output current imbalance. In extreme scenarios, one converter may be forced to supply nearly the entire load power, severely impacting its service life and reliability. Generally, the component characteristics, the output voltage levels, the output impedance values and the voltage ripples of different power supplies are not always identical. Therefore, it is important to provide an effective current-sharing method.

In accordance with a first current-sharing technology, an active current-sharing method is adopted. In the active current-sharing method, multiple power supplies are connected with each other through a current-sharing bus. According to the result of comparing the internal current-detection signal of each power supply with the signal on the current-sharing bus, the output voltage of the power supplies providing less current is increased to achieve the current balance. This method can achieve precise current-sharing performance under stable load conditions. However, the limitation of the active current-sharing method lies in its insufficient responsiveness to the continuously varying dynamic loads.

In accordance with a second current-sharing technology, a droop current-sharing method is adopted. In contrast to active current-sharing technology, the use of the droop current-sharing method does not require a dedicated current-sharing bus to connect all power supplies. Instead, the internal current signal of each power supply is utilized. The concept is based on the adjustment the impedance value of a virtual impedance. Consequently, the output voltage decreases with increasing load. In response to the amount of the load change, the droop current-sharing method can naturally adjust the magnitude of the output voltage to achieve the current-sharing purpose. Although the droop current-sharing method is effective to increase the value of the virtual impedance and reduce the current-sharing error, the error of the output voltage of the power supply in the steady state increases.

In order to overcome the drawbacks of the conventional technologies, it is important to provide an improved power supply system and an associated control method.

SUMMARY OF THE INVENTION

The present disclosure provides a power supply system and an associated control method. A virtual inductor mechanism is combined with an active current-sharing mechanism and a droop current-sharing mechanism. Consequently, the output voltage level of the power supply in the steady state is only determined by the droop current-sharing mechanism without the need of introducing additional voltage drop. However, it still responds to the di/dt of the output current by slightly adjusting the output voltage. As a result, the current ripple components in the output current of the DC-DC converter indirectly caused by PFC rectification in the range between two times and four times the mains frequency can be suppressed. Moreover, during the dynamic load test of the power supply, the output voltage is adjusted according to the rate of change of the current ripple (di/dt). Consequently, the transient current-sharing imbalance after the load transition will be reduced. After the load transition is ended, the voltage level is returned to the voltage level defined in the droop current-sharing mechanism without affecting the steady-state voltage error specification.

In accordance with an aspect of the present disclosure, a control method for a power supply system is provided. The power supply system includes a plurality of power supplies. The output terminals of the plurality of power supplies are connected with each other in parallel. Each power supply includes a power converter and a control unit. An input power received by each power supply is converted into an output voltage and an output current by the corresponding power converter. The control method is implemented by the control unit of each power supply. The control unit includes a detection unit, a droop current-sharing unit, a virtual inductor unit, an active current-sharing unit, an adder-subtractor and a control signal generator. The control method includes following steps. In a step (S1), the detection unit detects the output voltage, the output current and a current-sharing bus signal, thereby generating an output voltage detection signal, an output current detection signal and an active current-sharing control command. In a step (S2), the droop current-sharing unit generates a droop compensation voltage according to the output current detection signal. As the output current increases, the output voltage decreases according to the droop compensation voltage. In a step (S3), the virtual inductor unit processes the output current detection signal into a virtual inductive compensation voltage according to a first impedance model, wherein the first impedance model is expressed as:

$$\frac{sLv1}{1+\left(\frac{sLv1}{Rv1}\right)},$$

wherein Lv1 is a first virtual inductance value, Rv1 is a first virtual resistance value, and s represents a Laplace variable. In a step (S4), the active current-sharing unit generates a current-sharing compensation voltage according to a result of comparing the active current-sharing control command with the output current detection signal. In a step (S5), the adder-subtractor performs addition/subtraction on the droop compensation voltage, the virtual inductive compensation voltage and the current-sharing compensation voltage. Consequently, a reference voltage is generated. In a step (S6), the control signal generator generates a control signal according to the reference voltage and the output voltage detection signal so as to control operations of the power converter.

In accordance with another aspect of the present disclosure, a power supply system is provided. The power supply system includes a plurality of power supplies. The output terminals of the plurality of power supplies are connected with each other in parallel. Each of the plurality of power supplies includes a power converter and a control unit. An input power received by the power supply is converted into an output voltage and an output current by the power converter. The control unit is configured to control operations of the power converter. The control unit includes a detection unit, a droop current-sharing unit, an active current-sharing unit, an adder-subtractor and a control signal generator. The detection unit detects the output voltage, the output current and a current-sharing bus signal, and generates an output voltage detection signal, an output current detection signal and an active current-sharing control command. The droop current-sharing unit generates a droop compensation voltage according to the output current detection signal. The virtual inductor unit processes the output current detection signal into a virtual inductive compensation voltage according to a first impedance model, wherein the first impedance model is expressed as:

$$\frac{sLv1}{1+\left(\frac{sLv1}{Rv1}\right)},$$

wherein Lv1 is a first virtual inductance value, Rv1 is a first virtual resistance value, and s represents a Laplace variable. The active current-sharing unit generates a current-sharing compensation voltage according to a result of comparing the active current-sharing control command with the output current detection signal. The adder-subtractor performs addition/subtraction on the droop compensation voltage, the virtual inductive compensation voltage and the current-sharing compensation voltage, so that a reference voltage is generated. The control signal generator generates a control signal according to the reference voltage and the output voltage detection signal so as to control the operations of the power converter.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
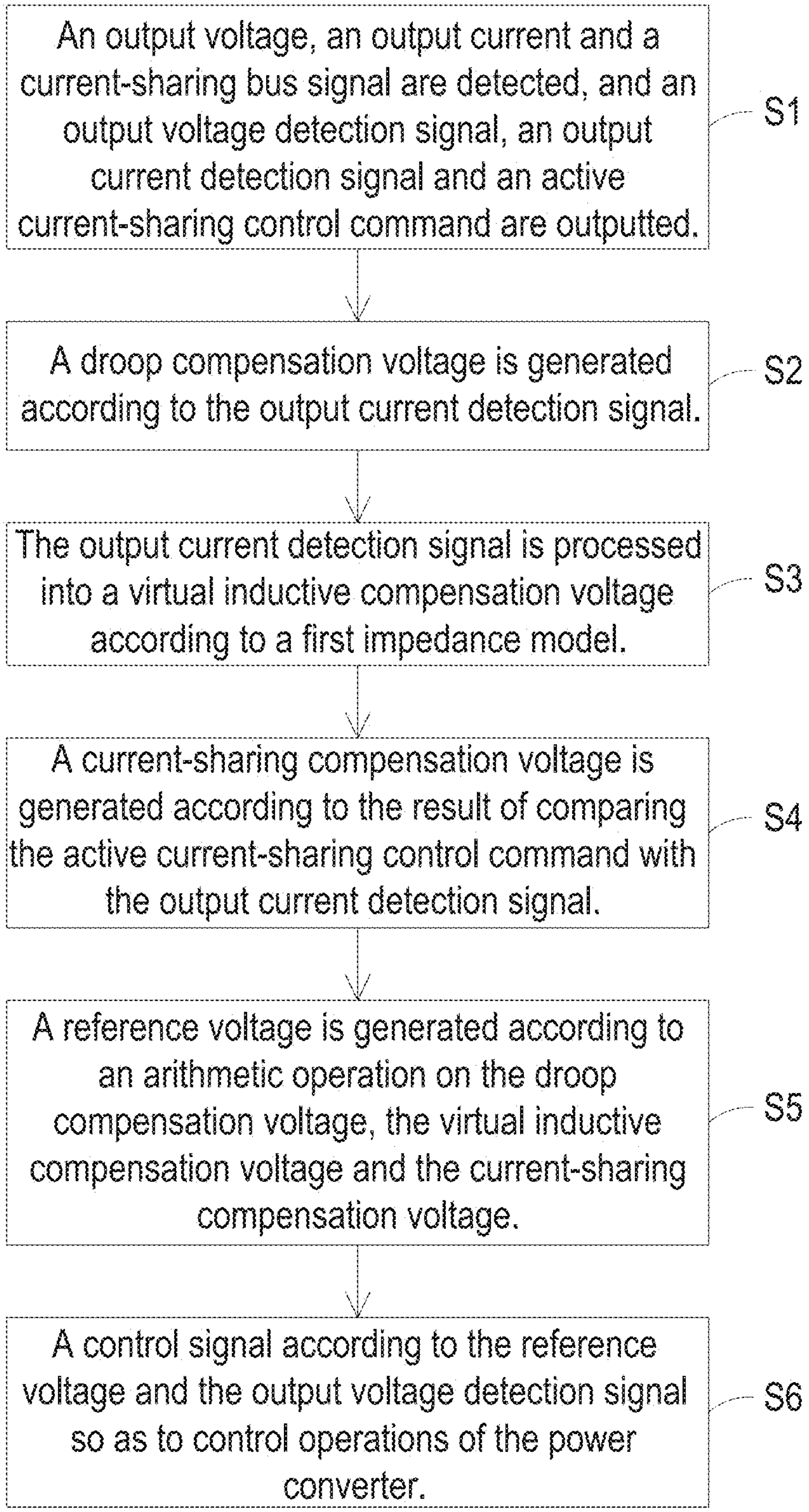
FIG. 1 is a flowchart illustrating a control method for a power supply system according to an embodiment of the present disclosure.
Figure 2:
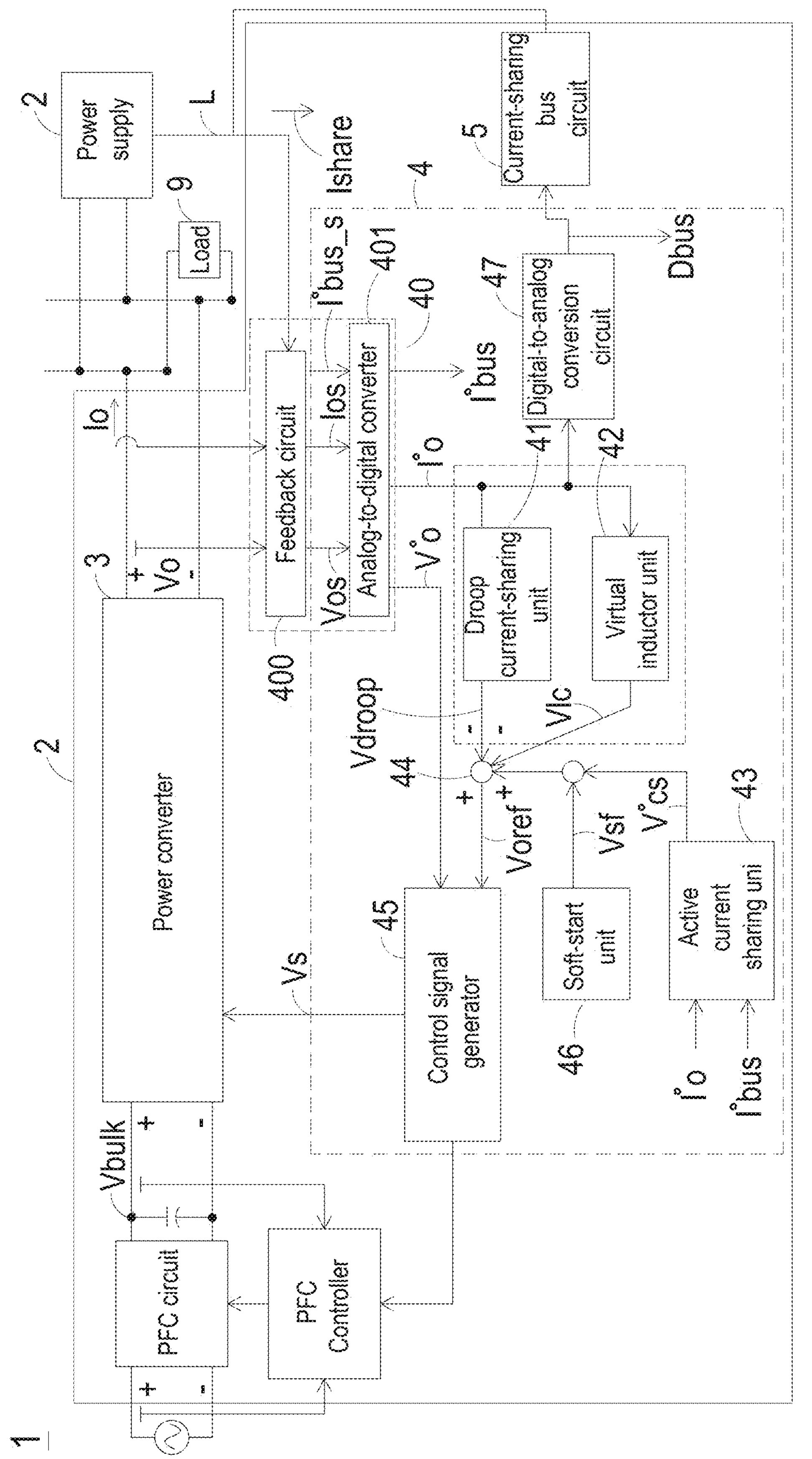
FIG. 2 is a schematic circuit diagram illustrating the power supply system using the control method of FIG. 1.

Please refer to FIGS. 1 and 2. FIG. 1 is a flowchart illustrating a control method for a power supply system according to an embodiment of the present disclosure. FIG. 2 is a schematic circuit diagram illustrating the power supply system using the control method of FIG. 1.

The power supply system includes a plurality of power supplies 2. The output terminals of the plurality of power supplies 2 are connected with each other in parallel and connected with a load 9. The circuitry topologies of the plurality of power supplies 2 are similar or identical. Each power supply 2 includes a power converter 3 and a control unit 4. The power converter 3 includes at least one switch (not shown). According to the switching operation of the at least one switch of the power converter 3, the input power received by the power supply 2 is converted into an output voltage Vo and an output current Io.

The control unit 4 detects the output voltage Vo, the output current Io and a current-sharing bus signal Ishare. According to the detection results, the control unit 4 controls the operation of the at least one switch of the power converter 3. In an embodiment, the control unit 4 includes a detection unit 40, a droop current-sharing unit 41, a virtual inductor unit 42, an active current sharing unit 43, an adder-subtractor 44 and a control signal generator 45.

The detection unit 40 is electrically connected with the output terminal of the power converter 3. The detection unit 40 is configured to detect the output voltage Vo and the output current Io of the power converter 3 and the current-sharing bus signal Ishare. In addition, the detection unit 40 generates an output voltage detection signal V°o, an output current detection signal I°o and an active current-sharing control command I°bus.

The droop current-sharing unit 41 is electrically connected with the detection unit 40. The droop current-sharing unit 41 is configured to generate a droop compensation voltage Vdroop according to the output current detection signal I°o. This droop compensation voltage Vdroop causes the output voltage Vo to decrease with the increasing output current.

The virtual inductor unit 42 is electrically connected with the detection unit 40. In addition, the virtual inductor unit 42 includes a first impedance model with inductive characteristics. The virtual inductor unit 42 processes the output current detection signal I°o into a virtual inductive compensation voltage Vlc according to the first impedance model. The first impedance model may be expressed as the following formula:

$$\frac{sLv1}{1+\left(\frac{sLv1}{Rv1}\right)}.$$

In the above formula, Lv1 is a first virtual inductance value, Rv1 is a first virtual resistance value, and s represents the Laplace variable.

The active current-sharing unit 43 is electrically connected with the detection unit 40. The active current-sharing unit 43 is configured to compare the active current-sharing control command I°bus with the output current detection signal I°o. According to the comparison result, the active current-sharing unit 43 generates a current-sharing compensation voltage V°cs.

The adder-subtractor 44 is electrically connected with the droop current-sharing unit 41, the virtual inductor unit 42 and the active current-sharing unit 43. The adder-subtractor 44 is configured to perform arithmetic operations (e.g., addition/subtraction) on the droop compensation voltage Vdroop, the virtual inductive compensation voltage Vlc and the current-sharing compensation voltage V°cs. Consequently, a reference voltage V°oref is generated.

The control signal generator 45 is electrically connected with the adder-subtractor 44 and the power converter 3. The control signal generator 45 is configured to generate a corresponding control signal Vs according to the reference voltage V°oref and the output voltage detection signal V°o in order to control the operation of the power converter 3. The control signal Vs includes a plurality of driving signals for driving a plurality of switches in the power converter 3. Furthermore, the control signal generator 45 has a voltage regulation function. In other words, the control signal generator 45 can be served as a voltage regulation control generator.

As mentioned above, the droop current-sharing unit 41 and the active current-sharing unit 43 in the control unit 4 of the power supply 2 are responsible for the current-sharing control functions. Furthermore, the virtual inductor unit 42 uses the first impedance model with inductive characteristics to generate the virtual inductive compensation voltage. Consequently, the virtual inductor unit 42 is formed as a first virtual inductor.

When multiple power supplies 2 are operated in the steady state and in parallel connection, the instantaneous current-sharing errors are primarily influenced by the output current ripple, which is indirectly caused by the second harmonic ripple of the power factor correction (PFC) circuit. That is, the PFC rectification introduces a second harmonic ripple on the bus voltage Vbulk, which results in output voltage ripple. This output voltage ripple also causes the output current ripple during parallel operation. However, the rate of change of the current ripple (di/dt) is relatively small. Consequently, the corresponding voltage drop across the first virtual inductor formed by the virtual inductor unit 42, i.e., Lv1×di/dt, is also small. In case that a single power supply is operated in the steady state, the voltage drop across the virtual inductor is nearly zero because the current-sharing ripple does not exist.

Consequently, regardless of the parallel operation or the standalone operation in the steady state (i.e., the load current, the resistance, or the power is fixed), the first virtual inductor has minimal impact on the output voltage Vo of the power supply 2. That is, the voltage level of the output voltage Vo in the steady state is not affected, and no additional error is introduced to the output voltage Vo.

By appropriately selecting the first virtual inductance value and the first virtual resistance value in the first impedance model of the virtual inductor unit 42, the virtual inductance can increase the output impedance at the frequencies above the second harmonic under the steady-state parallel load conditions. Once the current ripple appears, the virtual inductance generates a voltage drop proportional to the rate of change of the output current (di/dt), which helps counteract the output voltage ripple caused by the second harmonic and its higher-order harmonics. Consequently, the current ripple is reduced.

Under the dynamic parallel load conditions, the first virtual inductor formed by the virtual inductor unit 42 produces a voltage drop according to the di/dt of the output current. This voltage drop influences the transient behavior of each power supply. Consequently, the normalized output impedance values of different power supplies will be more closely matched (approximately 1:1). As a result, the output impedance mismatch caused by component tolerances or differences in parallel path lengths will be reduced. It helps to reduce the transient current-sharing errors and improves the stability of the power supply 2 during dynamic load tests.

In order to suppress the second harmonic current ripple of the power supply 2 or its fourth harmonic or higher-frequency harmonics, the cutoff frequency of the virtual inductor unit 42 can be designed to be equal to a specified value that is lower than a predetermined frequency value. For example, the cutoff frequency may be expressed as the following formula:

$$\frac{Rv1+Rd}{Lv1*2\pi}.$$

Consequently, the current harmonics with frequencies above the predetermined value will be suppressed. Preferably but not exclusively, the predetermined frequency is in the range between 94 Hz (i.e., two times the mains frequency 47 Hz to 63 Hz) and four times the mains frequency. In the above formula, Rd represents the equivalent virtual resistance value of the droop current-sharing unit 41. The value of Rd can be set according to the product's voltage regulation precision specification. For example, the value of Rd is the equivalent virtual resistance value corresponding to a 1% droop rate of the droop current-sharing unit 41.

In an embodiment, the control units 4 of the plurality of power supplies 2 can communicate with each other through a communication line L (i.e., a current-sharing bus) and a current-sharing bus signal Ishare on the current-sharing bus. Each power supply 2 receives the current-sharing bus signal Ishare. By a feedback circuit 400 and an analog-to-digital converter (ADC) 401 in the power supply 2, the current-sharing bus signal Ishare is converted into the active current-sharing control command I°bus. According to the active current-sharing control command I°bus, the active current-sharing unit 43 controls the output current.

The output current detection signal I°o generated by each power supply 2 is inputted into a digital-to-analog conversion circuit 47 and amplified. Consequently, the output current detection signal I°o is converted into an analog signal Dbus. After the analog signal Dbus is processed by a current-sharing bus circuit 5, the current-sharing bus circuit 5 determines whether the current-sharing bus signal Ishare is selectively outputted.

For example, only the power supply 2 with the highest analog signal Dbus (i.e., the highest output current detection signal I°o) is selected to dominate the current-sharing bus signal Ishare, and the corresponding analog signal Dbus is amplified by the current-sharing bus circuit 5 and then outputted to the current-sharing bus signal Ishare. As a result, the current-sharing bus signal Ishare corresponds to (for example, is equal to or is proportional to) the output analog signal Dbus of the power supply 2 with the highest output current detection signal I°o.

Preferably but not exclusively, the control unit 4 is a digital signal processor (DSP). In an embodiment, the feedback circuit 400 and the analog-to-digital converter (ADC) 401 are included in the detection unit 40. The feedback circuit 400 generates a voltage feedback signal Vos, a current feedback signal Ios and a current-sharing bus feedback signal I°bus_s according to the output voltage Vo, the output current Io and the current-sharing bus signal Ishare. The analog-to-digital converter 401 performs analog-to-digital conversion on the voltage feedback signal Vos, current feedback signal Ios and current-sharing bus feedback signal I°bus_s. Consequently, the analog-to-digital converter 401 outputs digital signals, including the output voltage detection signal V°o (corresponding to the voltage feedback signal Vos), the output current detection signal I°o (corresponding to the current feedback signal Ios) and the active current-sharing control command I°bus.

Furthermore, during the dynamic load transition, the variation ΔVref in the output voltage Vo of the power supply 2 satisfies a defined condition. The defined condition may be expressed: $\Delta Vref=\Delta I\times[Rv1\times e^{-t(Rv1/Lv1)}+Rd]$. The variation ΔVref in the output voltage Vo remains within a voltage transient specification range. For example, the output voltage Vo of the power supply 2 remains within 12V±360 mV after 0.5 ms of a load step. In the formula, t is the elapsed time after the load transition, and Lv1/Rv1 is the time constant. Preferably but not exclusively, each power supply 2 has an LLC circuit topology.

In order to effectively reduce current-sharing errors among power supplies 2 during the dynamic load transition, the virtual inductor unit 42 includes not only the first impedance model but also a second impedance model. The second impedance model may be expressed as the following formula:

$$\frac{sLv2}{1+\left(\frac{sLv2}{Rv2}\right)}.$$

In the above formula, Lv2 is a second virtual inductance value, Rv2 is a second virtual resistance value, and s represents the Laplace variable.

Due to the second impedance model, the virtual inductor unit 42 is formed as a second virtual inductor. By appropriately selecting the second virtual inductance value and the second virtual resistance value in the second impedance model of the virtual inductor unit 42, the output impedance of the power supply 2 in higher frequency regions (e.g., 500 Hz to 3 kHz) can be effectively increased. Consequently, the instantaneous current differences among multiple power supplies 2 after the load transition will be limited, and the transient current-sharing performance of the power supplies 2 will be improved.

In an embodiment, the control unit 4 further includes a soft-start unit 46, which is electrically connected to the adder-subtractor 44. The soft-start unit 46 is configured to output a soft-start voltage command Vsf to the adder-subtractor 44. After the arithmetic operations (e.g., addition/subtraction) are performed on the droop compensation voltage Vdroop, the virtual inductive compensation voltage Vlc, the current-sharing compensation voltage V°cs and the soft-start voltage command Vsf, the adder-subtractor 44 generates the reference voltage V°oref. According to the reference voltage V°oref and the output voltage detection signal V°o, the control signal generator 45 generates the corresponding control signal Vs to control the soft-start switching action of the switches of the power converter 3.

The relationships between the first virtual inductance value Lv1 and the first virtual resistance value Rv1 of the first impedance model in the virtual inductor unit 42, the second virtual inductance value Lv2 and the second virtual resistance value Rv2 of the second impedance model in the virtual inductor unit 42 and associated parameters (e.g., the reference voltage V°oref and the output voltage detection signal V°o) will be described as follows. For illustration, the continuous-time s-domain impedance relationships are transformed into z-domain transfer functions, wherein discrete-time characteristics for implementation in digital control are taken into account.

Firstly, the s-domain transfer function defined by the impedance model in the virtual inductor unit 42 may be expressed as the following formula (1):

$$\frac{V^{\circ}oref(s)}{I^{\circ}o(s)}=\frac{voref(s)\times HvoFB}{io(s)\times HioFB}=-\sum_{n=1}^{2}\frac{sLvn\times\frac{HvoFB}{HioFB}}{1+\frac{sLv}{Rvn}} \quad (1)$$

In the above formula, V°oref(s) is the reference voltage of the power supply 2 in the s-domain, I°o is the output current detection signal I°o of the power supply 2 in the s-domain, HvoFB is the output voltage feedback gain, and HioFB is the output voltage feedback gain. In addition, the output voltage feedback gain HvoFB and the output voltage feedback gain HioFB may be expressed as the following formulas:

$$HvoFB = \frac{V°o}{Vo};$$

$$HioFB = \frac{I°o}{Io}.$$

In order to implement the virtual inductor unit 42 in a digital signal processor, the s-domain transfer function needs to be converted into a z-domain transfer function. For example, the discretization method can be a backward difference method or a trapezoidal method.

In the backward difference method, the discretized form may be expressed as the following formula:

$$s \cong \frac{1 - Z^{-1}}{Ts}.$$

In the trapezoidal method, the discretized form may be expressed as the following formula:

$$s \cong \frac{1 - Z^{-1}}{1 + Z^{-1}} \times \frac{2}{Ts}.$$

In the above formulas, Ts is the sampling period of the detection unit 40, and $z^{-1}$ represents a one-sample-period delay.

By using the backward difference method as an example, the formula (1) is discretized to obtain the following expression:

$$\frac{V°oref(z)}{I°o(z)} = -\sum_{n=1}^{2} \frac{\left(\frac{1 - Z^{-1}}{Ts}\right) Lvn \times \frac{HvoFB}{HioFB}}{1 + \left(\frac{1 - Z^{-1}}{Ts}\right) \frac{sLv}{Rvn}} = -\sum_{n=1}^{2} \frac{K°RLN(1 - Z^{-1})}{1 - C°RLN \times Z^{-1}};$$

$$K°RLN = \frac{Lvn}{Ts} \times \frac{HvoFB}{HioFB} \times \frac{Ts \times Rvn/Lvn}{1 + (TsRvn/Lvn)};$$

$$C°RLN = \frac{1}{1 + (Ts \times Rvn/Lvn)}.$$

According to the z-domain transfer function, the difference equation for the virtual inductance compensation amount implemented by the virtual inductor unit 42 is given as follows:

$$v[k] = K°RLN \cdot (I°o[k] - I°o[k-1]) + C°RLN \cdot v[k-1].$$

In the above equation, I°o[k] is the output current detection signal I°o of the power supply 2 in the current sampling period, I°o[k−1] is the output current detection signal I°o of the power supply 2 in the previous sampling period, v[k] is the virtual inductance compensation amount in the current sampling period, and v[k−1] is the virtual inductance compensation amount in the previous sampling period.

Consequently, when the virtual inductor unit 42 is formed as the first virtual inductor, the virtual inductive compensation voltage Vlc is equal to the first virtual inductance compensation amount. In contrast, when the virtual inductor unit 42 is formed as the first virtual inductor and the second virtual inductor, the virtual inductive compensation voltage Vlc is equal to the sum of the first virtual inductance compensation amount and the second virtual inductance compensation amount.

The present disclosure further provides a control method for the power supply system. Please refer to FIG. 1 again. The control method includes the following steps.

In a step S1, an output voltage Vo, an output current Io and a current-sharing bus signal Ishare are detected, and an output voltage detection signal V°o, an output current detection signal I°o and an active current-sharing control command I°bus are outputted.

In a step S2, a droop compensation voltage Vdroop is generated according to the output current detection signal I°o. That is, the droop current-sharing unit 41 is configured to generate the droop compensation voltage Vdroop according to the output current detection signal I°o. This droop compensation voltage Vdroop causes the output voltage Vo to decrease with the increasing output current.

In a step S3, the output current detection signal I°o is processed into a virtual inductive compensation voltage Vlc according to a first impedance model.

In a step S4, a current-sharing compensation voltage V°cs is generated according to the result of comparing the active current-sharing control command I°bus with the output current detection signal I°o.

In a step S5, addition/subtraction operations are performed on the droop compensation voltage Vdroop, the virtual inductive compensation voltage Vlc and the current-sharing compensation voltage V°cs, and thus a reference voltage V°oref is generated.

In a step S6, a control signal Vs is generated according to the reference voltage V°oref and the output voltage detection signal V°o in order to control the operation of the power converter 3. The control signal Vs includes a plurality of driving signals for driving a plurality of switches in the power converter 3. Since the output voltage Vo can track the reference voltage V°oref, the voltage regulation function can be achieved.

Figure 3:
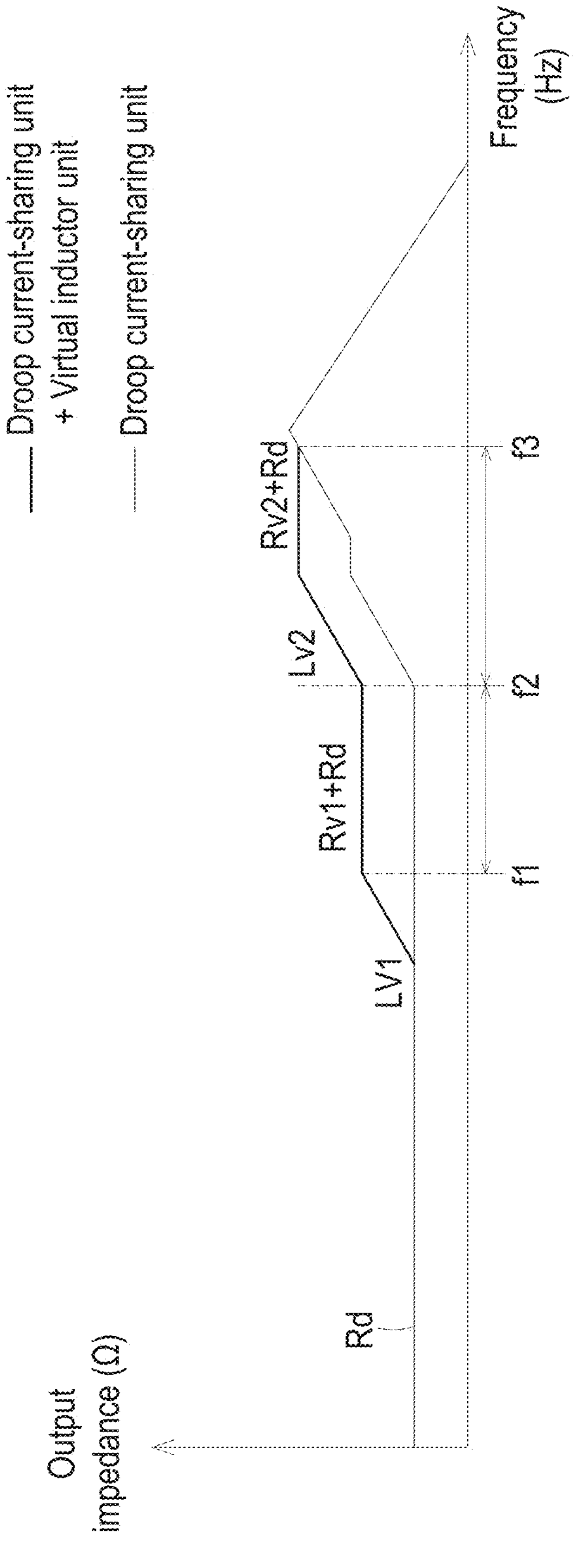
FIG. 3 illustrates the relationship between the output impedance of a power supply and the disturbance frequency of its output current for any power supply unit in the power supply system shown in FIG. 2 under the conditions with and without the virtual inductor unit in the control unit.

FIG. 3 illustrates the relationship between the output impedance of a power supply and the disturbance frequency of its output current for any power supply unit in the power supply system shown in FIG. 2 under the conditions with and without the virtual inductor unit in the control unit. The control unit 4 of the power supply 2 not only performs the current-sharing control through the droop current-sharing unit 41 and the active current-sharing unit 43, but also generates the virtual inductance compensation voltage through the virtual inductor unit 42 according to the first impedance model with inductive characteristics. Furthermore, the cutoff frequency of the virtual inductor unit 42 is equal to a specified value lower than the predetermined frequency value. For example, the cutoff frequency is expressed as:

$$\frac{Rv1 + Rd}{Lv1 * 2\pi}.$$

Consequently, during the transient operation of the power supply 2, it is not necessary to increase the equivalent virtual resistance of the droop current-sharing unit 41. Instead, the first virtual inductance formed by the virtual inductor unit 42 can be used to shorten the current-sharing stabilization time in power supply 2 and to reduce both the second harmonic current ripple and higher-order harmonics (e.g., in the first frequency range f1~f2).

Furthermore, the control unit 4 of the power supply 2 can utilize the virtual inductor unit 42 to form a second virtual inductance in order to effectively increase the output impedance of the power supply 2 in a higher frequency range (e.g., in the second frequency range f2~f3 as shown in FIG. 3). Consequently, the instantaneous current differences among multiple power supplies 2 will be limited, and the transient current-sharing performance of the power supplies 2 will be improved.

Figure 4:
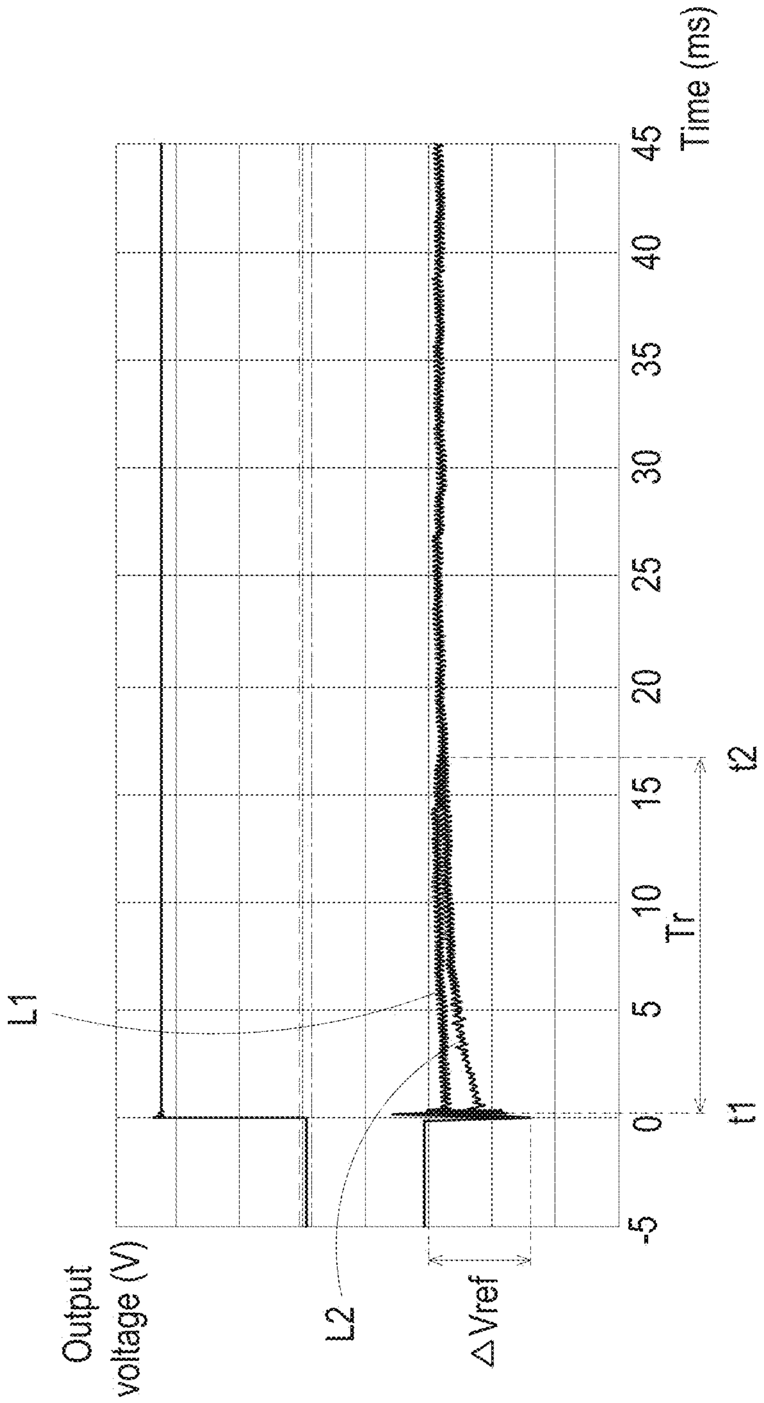
FIG. 4 illustrates the load transient response of the output voltage of the power supply shown in FIG. 2 under the conditions with and without the virtual inductor unit in the control unit.
Figure 5:
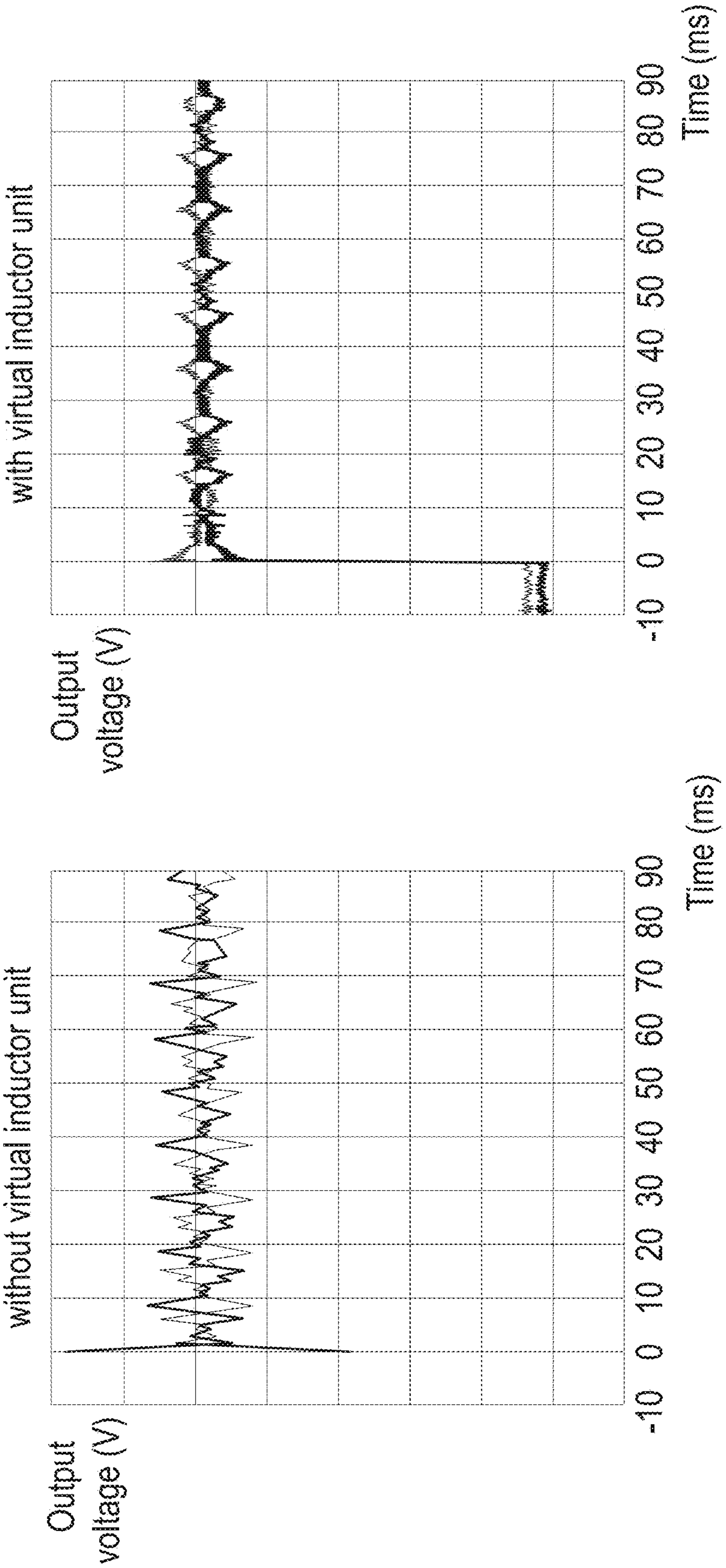
FIG. 5 illustrates the peak transient current and the peak-to-peak current ripple of the output current response during a parallel load transient test of the power supply shown in FIG. 2 under the conditions with and without the virtual inductor unit in the control unit.

FIG. 4 illustrates the load transient response of the output voltage of the power supply shown in FIG. 2 under the conditions with and without the virtual inductor unit in the control unit. FIG. 5 illustrates the peak transient current and the peak-to-peak current ripple of the output current response during a parallel load transient test of the power supply shown in FIG. 2 under the conditions with and without the virtual inductor unit in the control unit.

Please refer to FIG. 4. In accordance with the present disclosure, the control unit 4 of the power supply 2 utilizes the virtual inductor unit 42 to form the virtual inductance. In the stead state of the power supply 2, the voltage difference across the virtual inductor becomes zero because the current variation rate is zero. Consequently, the virtual inductance does not significantly affect the output voltage Vo of the power supply 2 under the steady-state condition. In the steady state, the output voltage Vo of the power supply 2 with the virtual inductor unit (e.g., the curve L2 shown in FIG. 4) and the output voltage Vo of the power supply 2 without the virtual inductor unit (e.g., the curve L1 shown in FIG. 4) overlap, indicating that the virtual inductance does not affect the steady-state level of the output voltage Vo.

Please refer to FIG. 5. In accordance with the present disclosure, the control unit 4 of the power supply 2 utilizes the virtual inductor unit 42 to reduce the transient peak value of the output current Io when compared with the power supply without the virtual inductor unit. Furthermore, the second-harmonic ripple current of the power supply 2 with the virtual inductor unit is reduced when compared with the power supply without the virtual inductor unit.

Under the step load test, the settling time Tr of the output voltage Vo of the power supply 2 after a load transition may be expressed as:

$$Tr = \frac{0.35}{\left(Rv1 + Rd/(Lv1 * 2\pi)\right)}.$$

From the above descriptions, the present disclosure provides a power supply system and a control method for the power supply system. The control unit of the power supply in the power supply system is equipped with a virtual inductor unit to generate the virtual inductance compensation voltage according to the first impedance model with inductive characteristics. Consequently, the virtual inductor unit is formed as a virtual inductor to enhance the current-sharing performance of the plurality of power supplies.

Under the dynamic parallel load conditions, the virtual inductor produces a voltage drop according to the di/dt of the output current. This voltage drop influences the transient behavior of each power supply. Consequently, the normalized output impedance values of different power supplies will be more closely matched (approximately 1:1). As a result, the output impedance mismatch caused by component tolerances or differences in parallel path lengths will be reduced. Therefore, the virtual inductor can dominate the output impedance ratio, which helps to reduce the transient current sharing errors and improve the stability of the power supply under dynamic load testing.

Furthermore, the use of the virtual inductor unit can increase the output impedance at the frequencies above the second harmonic. Once the current ripple appears in the parallel condition, the virtual inductance generates a voltage drop to help counteract the output voltage ripple caused by the second harmonic and its higher-order harmonics. Since the current ripple is reduced, the second harmonic current ripple of the power supply or its fourth harmonic or higher-frequency harmonics under the steady-condition or the dynamic load testing condition can be suppressed.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a power supply system, the power supply system comprising a plurality of power supplies, output terminals of the plurality of power supplies being connected with each other in parallel, each power supply comprising a power converter and a control unit, an input power received by each power supply being converted into an output voltage and an output current by the corresponding power converter, the control method being implemented by the control unit of each power supply, the control unit comprising a detection unit, a droop current-sharing unit, a virtual inductor unit, an active current-sharing unit, an adder-subtractor and a control signal generator, the control method comprising steps of:

the detection unit detecting the output voltage, the output current and a current-sharing bus signal, thereby generating an output voltage detection signal, an output current detection signal and an active current-sharing control command;

the droop current-sharing unit generating a droop compensation voltage according to the output current detection signal, wherein as the output current increases, the output voltage decreases according to the droop compensation voltage;

the virtual inductor unit processing the output current detection signal into a virtual inductive compensation voltage according to a first impedance model, wherein the first impedance model is expressed as:

$$\frac{sLv1}{1 + \left(\frac{sLv1}{Rv1}\right)},$$

wherein Lv1 is a first virtual inductance value, Rv1 is a first virtual resistance value, and s represents a Laplace variable;

the active current-sharing unit generating a current-sharing compensation voltage according to a result of comparing the active current-sharing control command with the output current detection signal;

the adder-subtractor performing addition/subtraction on the droop compensation voltage, the virtual inductive compensation voltage and the current-sharing compensation voltage, so that a reference voltage is generated; and the control signal generator generating a control signal according to the reference voltage and the output voltage detection signal so as to control operations of the power converter.

2. The control method according to claim 1, wherein a cutoff frequency of the virtual inductor unit is expressed as:

$$\frac{Rv1+Rd}{Lv1*2\pi},$$

wherein the cutoff frequency is lower than a predetermined frequency value, and Rd represents an equivalent virtual resistance value of the droop current-sharing unit.

3. The control method according to claim 2, wherein the predetermined frequency is in a range between two times and four times a mains frequency.

4. The control method according to claim 1, wherein the current-sharing bus signal corresponds to a power supply with a highest output current detection signal among the plurality of power supplies.

5. The control method according to claim 1, wherein the virtual inductor unit processes the output current detection signal into the virtual inductive compensation voltage according to the first impedance model and a second impedance model, wherein the second impedance model is expressed as:

$$\frac{sLv2}{1+\left(\frac{sLv2}{Rv2}\right)},$$

wherein Lv2 is a second virtual inductance value, and Rv2 is a second virtual resistance value.

6. The control method according to claim 1, wherein a variation in the output voltage of the power supply is expressed as: $\Delta I\times[Rv1\times e^{-t(Rv1/Lv1)}+Rd]$, wherein t is an elapsed time after a load transition, Lv1/Rv1 is a time constant, and Rd represents an equivalent virtual resistance value of the droop current-sharing unit.

7. The control method according to claim 1, wherein a settling time of the output voltage of the power supply after a load transition is expressed as:

$$\frac{0.35}{(Rv1+Rd/(Lv1*2\pi))},$$

wherein Rd represents an equivalent virtual resistance value of the droop current-sharing unit.

8. A power supply system comprising a plurality of power supplies, output terminals of the plurality of power supplies being connected with each other in parallel, each of the plurality of power supplies comprising:

a power converter, wherein an input power received by the power supply is converted into an output voltage and an output current by the power converter; and a control unit configured to control operations of the power converter, wherein the control unit comprises:

a detection unit configured to detect the output voltage, the output current and a current-sharing bus signal, thereby generating an output voltage detection signal and an output current detection signal;

a droop current-sharing unit configured to generate a droop compensation voltage according to the output current detection signal;

a virtual inductor unit configured to process the output current detection signal into a virtual inductive compensation voltage according to a first impedance model, wherein the first impedance model is expressed as:

$$\frac{sLv1}{1+\left(\frac{sLv1}{Rv1}\right)},$$

wherein Lv1 is a first virtual inductance value, Rv1 is a first virtual resistance value, and s represents a Laplace variable;

an active current-sharing unit configured to generate a current-sharing compensation voltage according to a result of comparing the active current-sharing control command with the output current detection signal;

an adder-subtractor configured to perform addition/subtraction on the droop compensation voltage, the virtual inductive compensation voltage and the current-sharing compensation voltage, so that a reference voltage is generated; and a control signal generator configured to generate a control signal according to the reference voltage and the output voltage detection signal so as to control the operations of the power converter.

9. The power supply system according to claim 8, wherein a cutoff frequency of the virtual inductor unit is expressed as:

$$\frac{Rv1+Rd}{Lv1*2\pi},$$

wherein the cutoff frequency is lower than a predetermined frequency value, and Rd represents an equivalent virtual resistance value of the droop current-sharing unit.

10. The power supply system according to claim 9, wherein the predetermined frequency is in a range between two times and four times a mains frequency.

11. The power supply system according to claim 8, wherein the current-sharing bus signal corresponds to a power supply with a highest output current detection signal among the plurality of power supplies.

12. The power supply system according to claim 8, wherein the virtual inductor unit processes the output current detection signal into the virtual inductive compensation voltage according to the first impedance model and a second impedance model, wherein the second impedance model is expressed as:

$$\frac{sLv2}{1+\left(\frac{sLv2}{Rv2}\right)},$$

wherein Lv2 is a second virtual inductance value, and Rv2 is a second virtual resistance value.

13. The power supply system according to claim 8, wherein a variation in the output voltage of the power supply is expressed as: $\Delta I \times [Rv1 \times e^{-t(Rv1/Lv1)} + Rd]$, wherein t is an elapsed time after a load transition, Lv1/Rv1 is a time constant, and Rd represents an equivalent virtual resistance value of the droop current-sharing unit.

14. The power supply system according to claim 8, wherein a settling time of the output voltage of the power supply after a load transition is expressed as:

$$\frac{0.35}{(Rv1 + Rd/(Lv1 * 2\pi))},$$

wherein Rd represents an equivalent virtual resistance value of the droop current-sharing unit.

* * * * *